(12) United States Patent
Begin et al.

(10) Patent No.: US 10,465,604 B2
(45) Date of Patent: Nov. 5, 2019

(54) TURBOCHARGER FOR A VEHICLE ENGINE

(71) Applicant: GM GLOBAL TECHNOLOGY OPERATIONS LLC, Detroit, MI (US)

(72) Inventors: Louis P Begin, Rochester, MI (US); Dingfeng Deng, Auburn Hills, MI (US); Ran Wu, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 15/455,699

(22) Filed: Mar. 10, 2017

(65) Prior Publication Data

US 2018/0258843 A1 Sep. 13, 2018

(51) Int. Cl.
| | |
|---|---|
| F02B 33/44 | (2006.01) |
| F02B 39/14 | (2006.01) |
| F02B 37/00 | (2006.01) |
| F02B 33/40 | (2006.01) |
| F01D 25/18 | (2006.01) |
| F16C 33/66 | (2006.01) |
| F16C 17/18 | (2006.01) |

(52) U.S. Cl.
CPC .............. *F02B 39/14* (2013.01); *F01D 25/18* (2013.01); *F02B 33/40* (2013.01); *F02B 37/00* (2013.01); *F16C 17/18* (2013.01); *F16C 33/6685* (2013.01); *F05D 2220/40* (2013.01); *F16C 2360/24* (2013.01); *Y02T 10/144* (2013.01)

(58) Field of Classification Search
CPC .................. F02B 39/14; F01D 25/16–186
USPC ........................................... 60/605.3
See application file for complete search history.

(56) References Cited

U.S. PATENT DOCUMENTS

| | | | | |
|---|---|---|---|---|
| 3,993,370 | A * | 11/1976 | Woollenweber | F01D 25/166 417/407 |
| 4,997,290 | A * | 3/1991 | Aida | F01D 25/164 384/474 |
| 6,220,829 | B1 | 4/2001 | Thompson et al. | |
| 6,418,722 | B1 * | 7/2002 | Arnold | F01D 25/168 417/407 |
| 2011/0007991 | A1 * | 1/2011 | Miller | F16C 33/6659 384/474 |
| 2014/0178188 | A1 | 6/2014 | Li et al. | |
| 2015/0285301 | A1 | 10/2015 | Begin et al. | |

* cited by examiner

*Primary Examiner* — Ngoc T Nguyen
(74) *Attorney, Agent, or Firm* — Cantor Colburn LLP

(57) ABSTRACT

A turbocharger for an internal combustion engine includes a center housing and a bore defined by the center housing. The bore has a primary annular groove and a secondary annular groove configured to receive a fluid. A journal bearing is disposed within the bore proximate to a proximate end of the shaft such that the journal bearing, together with the rotating shaft, feeds fluid to the primary and secondary annular grooves. The shaft is further coupled to a turbine wheel and a compressor wheel. The shaft has a longitudinal axis and is supported by the journal bearing for rotation within the bore about the axis. The primary and secondary annular grooves are each in fluid communication with a drain gallery.

5 Claims, 4 Drawing Sheets

TURBOCHARGER FOR A VEHICLE ENGINE

TECHNICAL FIELD

The present disclosure generally relates to turbochargers used in vehicle engines, and in particular, managing the lubrication in the turbocharger housing.

BACKGROUND

Internal Combustion Engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing aft that is forced into the ICE improves the engine's volumetric efficiency, allowing it to burn more fuel in a given cycle, and thereby produce more power.

A typical turbocharger employs a central rotor shaft that transmits rotational motion between an exhaust-driven turbine wheel and an air compressor wheel. Such a rotor shaft is generally supported inside a center housing by thrust and journal bearings which are lubricated and cooled by engine oil and frequently receive additional cooling from specially formulated engine coolant. The exhaust gases that drive the turbine are prevented from entering the center housing by piston ring seals.

Turbochargers generally include a turbine housing for directing exhaust gasses from an exhaust inlet to an exhaust outlet across a turbine rotor. The turbine rotor drives a shaft journaled in a center housing section. A compressor rotor is driven on the other end of the shaft. The compressor rotor is housed in a compressor housing which directs air from the air filter into the compressor and out to the charge air cooler. The center housing bearing cavity with protected from the exhaust gases on the turbine side and the compressed air from the compressor side by piston ring seals.

Crankcase oil is commonly used to lubricate the rotating bearing interfaces as well as the thrust surfaces that limit axial excursions of the rotor shaft. Temperatures above 800° C. can occur in the exhaust gas turbine in the case of Diesel engines and above 1,000° C. in the case of Otto-cycle engines. Heat migrating from the turbine housing and turbine wheel into the shaft and center housing raise the temperature high enough to degrade or "coke" the oil that comes in contact with the rotor shaft and center housing adjacent to the turbine stage. This built up coked oil may interfere bind between the shaft shoulder adjacent to the turbine seal and the center housing. This binding restricts shaft rotation resulting in poor turbocharger boost performance.

As indicated, coking is an on-going issue with turbochargers given the very high operating temperatures. More specifically, heat from the exhaust gas tends to be conducted along the turbine rotor. The turbine rotor is affixed to the turbocharger shaft and a turbine seal is implemented at the joint between the turbine rotor, the shaft and the center housing. As lubricating oil passes through the narrow gap between the turbine rotor and the bearings it is heated to an elevated temperature as the lubricating oil contacts the heated shaft proximate to the turbine rotor. Accordingly, as the lubricating oil subsequently contacts the shaft which is heated by the turbine housing, coking is likely to occur. Accordingly, there is a need for a simple, low cost and effective means to prevent coking in the center housing of a turbocharger.

The above information disclosed in this Background section is only for enhancement of understanding of the background of the invention, and therefore, it may contain information that does not form the prior art that is already known in this country to a person of ordinary skill in the art. Accordingly, there is a need for an improved turbocharger which reduces coking at the turbine shaft adjacent to the seal.

SUMMARY

The present disclosure provides a turbocharger for an internal combustion engine. The turbocharger includes a center housing and a bore defined by the center housing. The bore defines a primary annular groove and a secondary annular groove configured to receive a fluid from the rotating shaft. A journal bearing is disposed within the bore proximate to a proximate end of the shaft. The shaft is further coupled to a turbine wheel at a proximate end of the shaft and a compressor wheel at a distal end of the shaft. The shaft has a longitudinal axis and is supported by the journal bearing for rotation within the bore about the axis. The primary and secondary annular grooves are each in fluid communication with a drain gallery.

The present disclosure further provides an internal combustion engine having an engine block having a combustion chamber, and a turbocharger. The turbocharger includes a center housing, a bore, and a rotating assembly. The rotating assembly includes a shaft having a proximate end with a turbine wheel configured to be driven by the post-combustion gasses exiting the combustion chamber. The shaft in the rotating assembly further includes a distal end with a compressor wheel configured to pressurize the airflow for delivery to the combustion chamber. The center housing defines primary and secondary annular grooves configured to receive fluid fed by rotating shaft and the journal bearing. The primary and secondary annular grooves may be disposed proximate to a proximate end of the shaft—between the journal bearing and a turbine seal. The rotating assembly also includes a shaft having a proximate end with a turbine wheel configured to be driven by the post-combustion gasses and a distal end with a compressor wheel configured to pressurize the airflow for delivery to the combustion chamber.

It is understood that in either the aforementioned turbocharger or the engine the journal bearing includes a first surface defined by an inner diameter, a second surface defined by an outer diameter, and a passage that connects the first and second surfaces. Moreover, it is also understood that a first conduit and a second conduit may also be defined in the center housing for either the aforementioned turbocharger or engine wherein the first conduit may couple the primary annular groove to the drain gallery and the second conduit may couple the secondary annular groove to the drain gallery.

In yet another embodiment of the present disclosure, the primary annular groove defines a first radius and the secondary annular groove defines a second radius, the second radius may be greater than the first radius.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1:
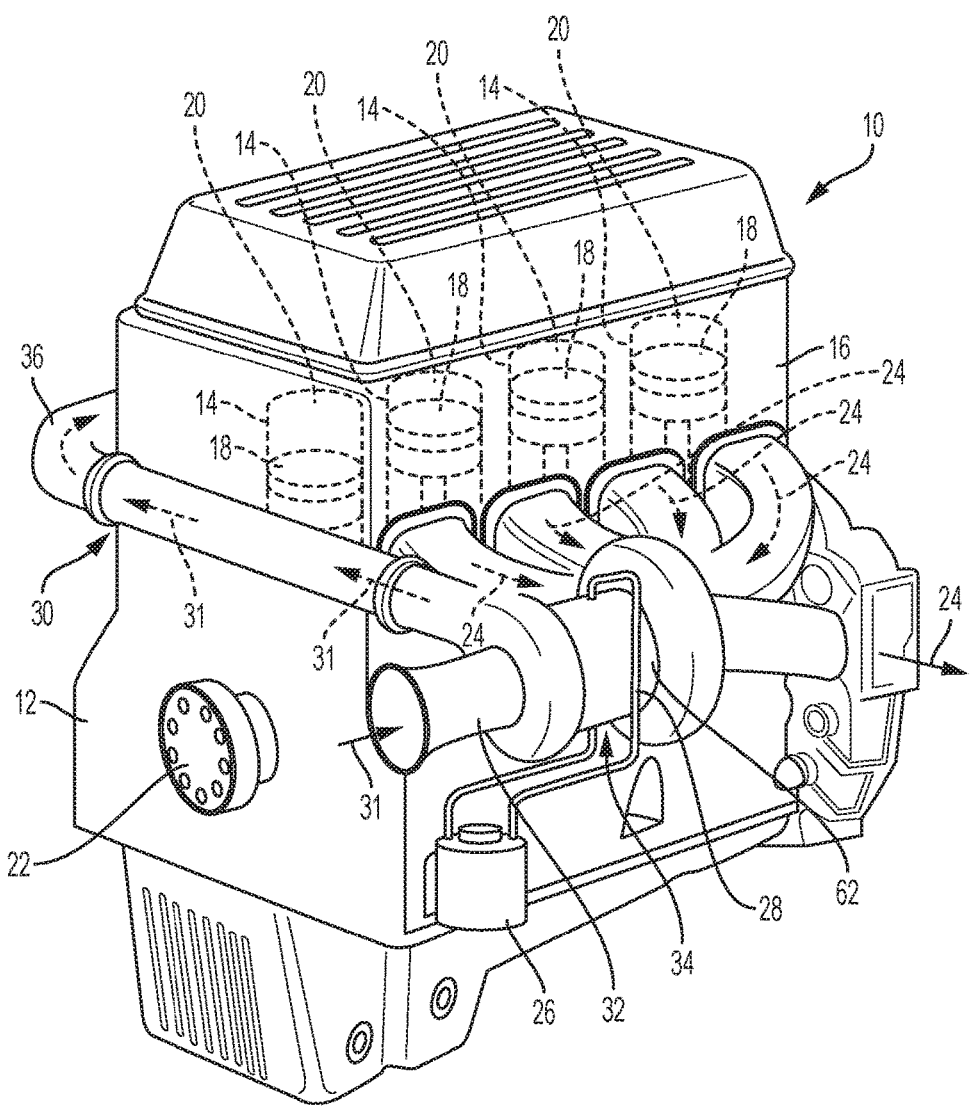
FIG. 1 illustrates a vehicle engine having a turbocharger in accordance with various embodiments of the present disclosure.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by length; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

With reference to FIG. 1, an internal combustion engine 10 is shown in accordance with various embodiments of the present disclosure. The engine 10 also includes an engine or cylinder block 12 with a plurality of cylinders 14 arranged therein. As shown, the engine 10 also includes a cylinder head 16. Each cylinder 14 includes a piston 18 configured to reciprocate therein. Combustion chambers 20 are formed within the cylinders 14 between the bottom surface of the cylinder head 16 and the tops of the pistons 18. As known by those skilled in the art, combustion chambers 20 are configured to receive a fuel-air mixture for subsequent combustion therein.

As shown, the engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 24 from the respective cylinder 14. The engine 10 also includes a fluid pump 26. The fluid pump 26 is configured to supply pressurized fluid or engine oil 28 to various bearings, such as that of the crankshaft 22. The pump 26 may be driven directly by the engine 10, or by an electric motor (not shown).

The engine 10 additionally includes an induction system 30 configured to channel airflow 31 from the ambient to the cylinders 14. The induction system 30 includes an intake air duct 32, a turbocharger 34, and an intake manifold 36. Although not shown, the induction system 30 may additionally include an air filter upstream of the turbocharger 34 for removing foreign particles and other airborne debris from the airflow 31. The intake air duct 32 is configured to channel the airflow 31 from the ambient to the turbocharger 34, while the turbocharger is configured to pressurize the received airflow, and discharge the pressurized airflow to the intake manifold 36. The intake manifold 36 in turn distributes the previously pressurized airflow 31 to the cylinders 14 for mixing with an appropriate amount of fuel and subsequent combustion of the resultant fuel-air mixture. While the present disclosure concentrates on the internal combustion engine 10 having a reciprocating configuration, other engine designs, such as a rotary engine that has combustion chambers 20, but not reciprocating pistons, are also envisioned.

Figure 2:
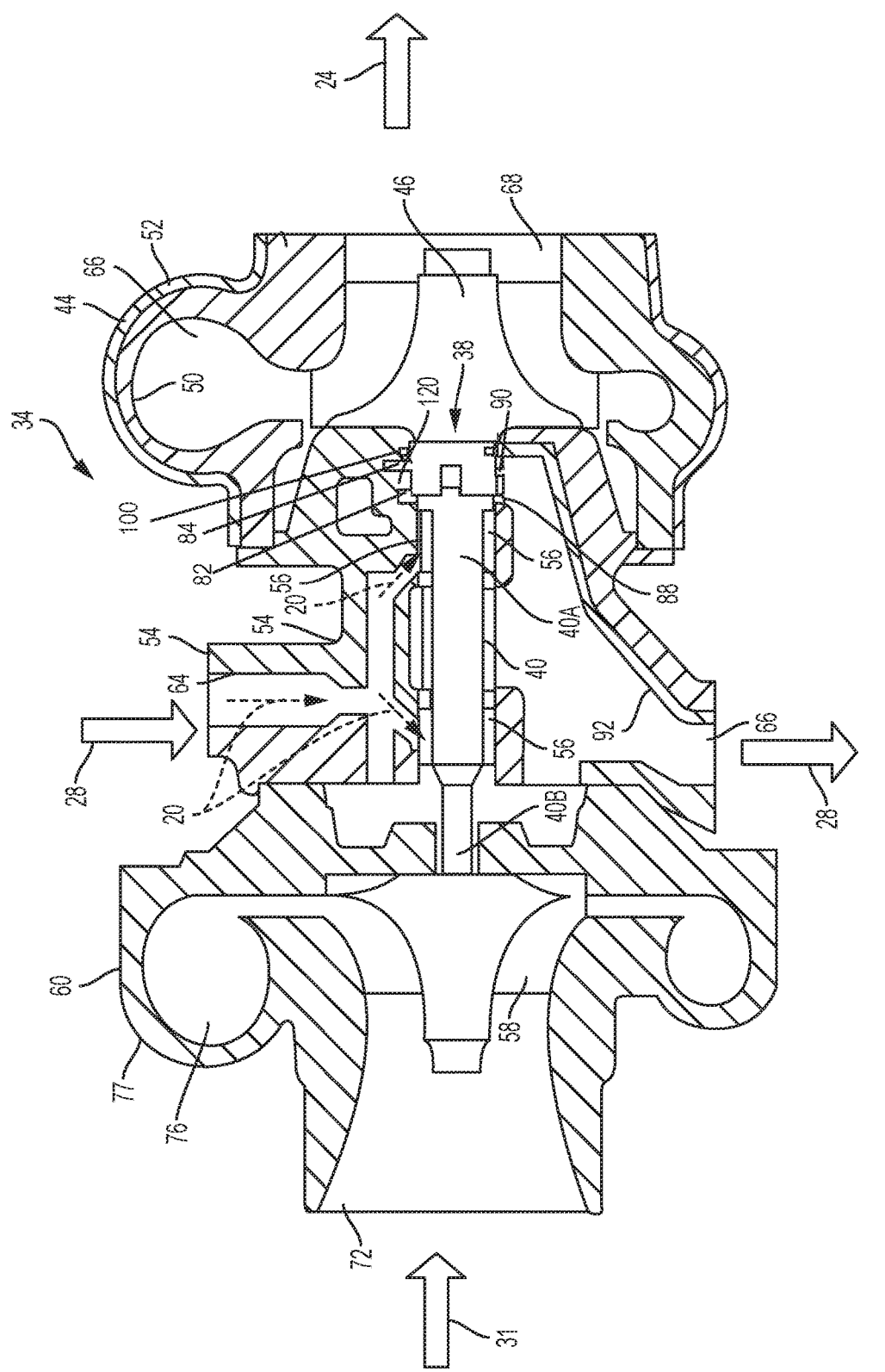
FIG. 2 illustrates a schematic cross-sectional view of a turbocharger according to various embodiments of the present disclosure.

Referring now to FIG. 2, the turbocharger 34 includes a rotating assembly 38. The rotating assembly 38 includes a shaft 40 that is typically formed from steel and is defined by a first proximate end 40A (turbine end) and a distal second end 40B (compressor end). A turbine wheel 46 is mounted on the shaft 40 proximate to the first end 40A and configured to be rotated along with the shaft 40 about a longitudinal axis 42 of the shaft by post-combustion gasses 24 emitted from the cylinders 14. The turbine wheel 46 is disposed inside a turbine housing 44 that includes a volute or scrod 50. The scroll 50 receives the post-combustion exhaust gases 24 and directs the exhaust gases to the turbine wheel 46. The scroll 50 is configured to achieve specific performance characteristics, such as efficiency and response, of the turbocharger 34.

As shown, the spinning turbine 46 is mounted on the same shaft as the compressor. Therefore, as the turbine 46 spins, the compressor spins too. The exhaust gas leaves the car, wasting less energy than it would otherwise. Accordingly, the rotation of the turbine 46, the shaft 40 and the compressor should not be impeded in order to provide optimum performance.

Referring now to FIG. 2, a schematic cross-sectional view of the turbocharger is shown. The turbocharger includes a turbocharger housing assembly 52 consisting of compressor housing 60, center housing 54 and turbine housing 44. Turbocharger housing assembly 52 includes a center section (center housing 54) receiving a pair of spaced apart journal bearings and rotatably receiving therein an elongate shaft 40. A turbine wheel 46 is attached to or integrally formed with one end 40A of shaft 40—the turbine end 40A of the shaft 40. At the opposite end 40B of shaft 40—the distal end 40B of the shaft 40, a compressor wheel 58 is carried thereon and may be drivingly secured thereto by a nut threadably engaging the shaft 40.

A turbine housing 44 may be integral with the center housing 54 and defines an exhaust gas inlet leading to a radially outer portion of the turbine wheel 46. The turbine housing 44 also defines an exhaust gas outlet 68 leading from the turbine wheel 46. Similarly, a compressor housing 60 defines an air inlet 72 leading to the compressor wheel 58 and an air outlet (not shown) opening from a diffuser chamber 77.

Upon shutdown of the engine supplying exhaust gasses to inlet, both the source of heat energy and the source of cooling oil flow to the turbocharger cease to operate. However, both the turbine housing 44 and turbine wheel 46 are hot and hold a considerable quantity of residual heat. This residual heat is conducted to the cooler parts of the turbocharger much as heat was conducted during operation thereof. However, no cooling oil flow or internal compressor air flow is now present. Consequently, the temperature of shaft 40 and center housing 54 progressively increase for a time over their normal operating temperatures. This temperature increase, if uncontrolled, could result in heightened temperatures at the shaft 40, the turbine housing 44, as well as the lubricant drain gallery 92. Heightened temperatures in these regions could degrade or coke the residual oil therein—particularly at the turbine seal 100 which may be located in groove 102 at the joint between the turbine 46, the shaft 40 and the center housing 54. Moreover, the relatively low mass and low heat storage capacity of the turbine wheel 46 are minor additional factors which further contribute to the problem of coking at the shaft 40. Oil degradation at the turbine seal 100 is particularly problematic given that this could cause resistance in rotation of the shaft 40 and lead to turbocharger failure. Accordingly, it is understood that heat transfer within turbocharger may occur from the turbine wheel 46 to the shaft 40 via a conductive path between the materials.

Figure 4:
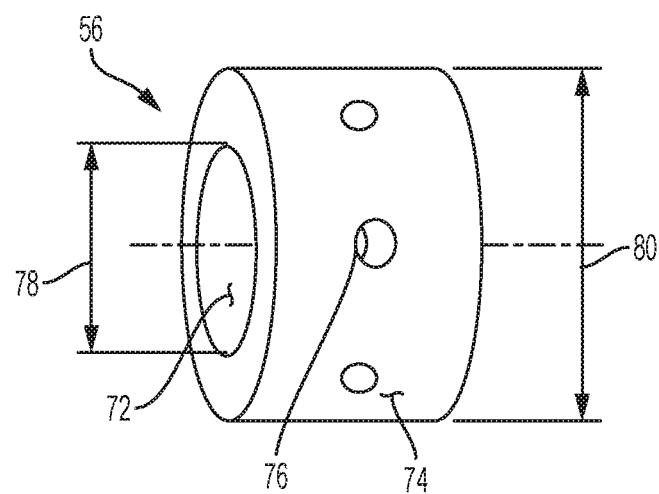
FIG. 4 illustrates a non-limiting example, journal bearing in accordance with various embodiments of the present disclosure.

As shown in FIG. 2, oil enters into the turbocharger via oil inlet 64 and is routed to at least one journal bearing 56 for the turbocharger shaft 40. While one journal bearing 56 maybe used, it is understood that multiple journal bearings 56 may also be used for a single shaft 40. The journal bearing 56 of the present disclosure may be configured as a fully-floating bearing 56 such that the fluid fed thereto forms a first fluid film between the bore and the journal bearing 56 and a second fluid film between the journal bearing 56 and the shaft 40. With reference to FIG. 4, the journal bearing 56 may also include a first surface defined by an inner diameter, a second surface defined by an outer diameter with a passage that connects the first and second surfaces. It is further understood that multiple passages may be defined in the journal bearing 56 which connect the first and second surfaces.

Figure 3:
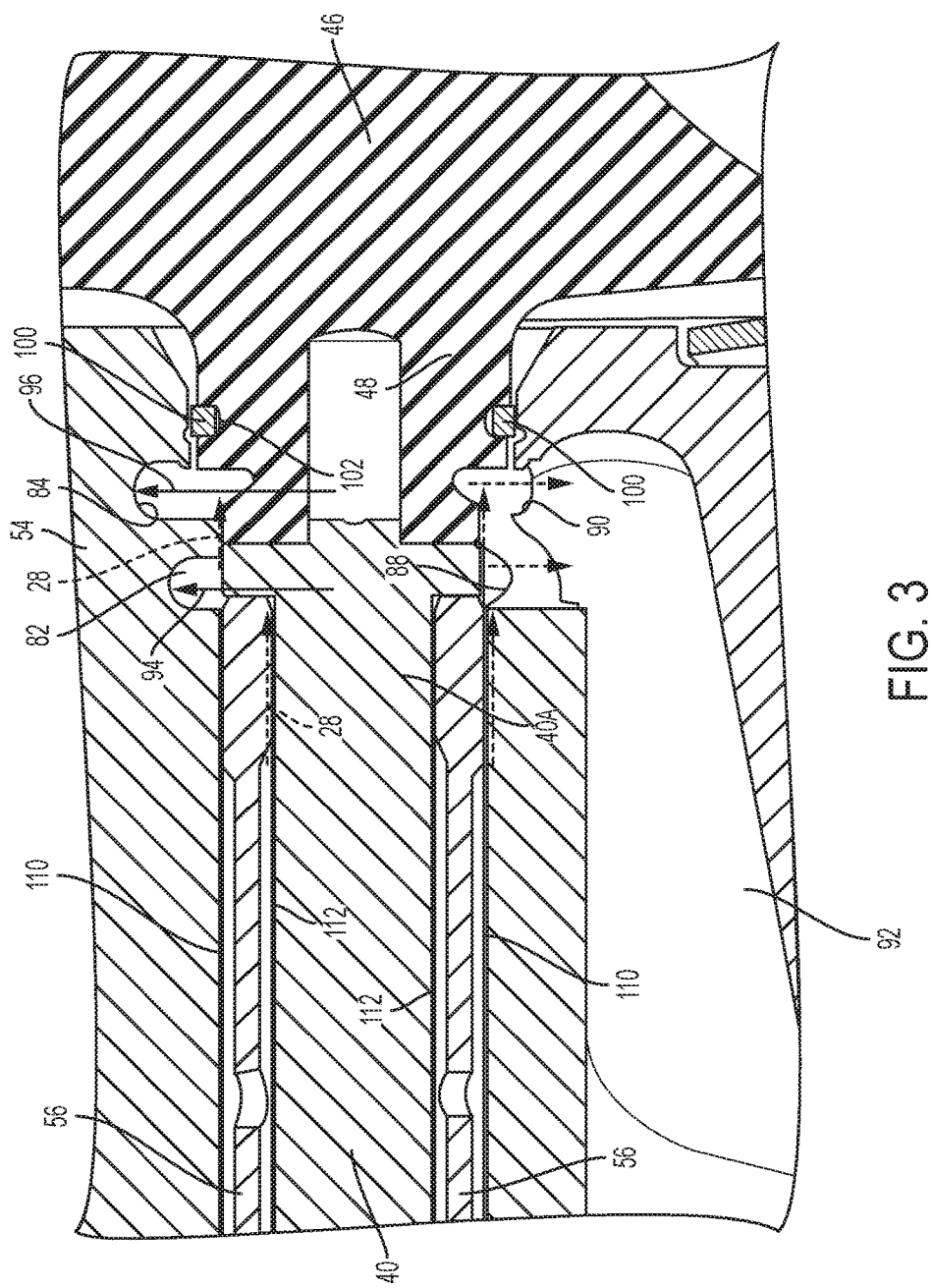
FIG. 3 illustrates an enlarged cross-sectional view of the center housing.

Referring now to FIG. 3, the primary annular groove 82 is configured to receive approximately 90 percent of oil flung radially outward by the spinning motion of shaft 40 and/or the journal bearing 56. In order to drain oil from this primary annular groove 82, the center housing 54 defines a first conduit 88 opening downwardly therefrom into drain gallery 92. The drain gallery 92 further includes an oil outlet 66 so that the oil may be routed out of the turbocharger 34. The center housing 54 further defines a first shoulder 120, a secondary annular groove 84 and a second conduit 90 The first shoulder 120 is also configured to separate and distinguish the primary annular groove 82 from the secondary annular groove 84. The secondary annular groove 84 is also in fluid communication with the drain gallery 92 via a second conduit 90.

While the first shoulder 120 does separate and distinguish the primary annular groove 82 from the secondary annular groove 84, the first shoulder 120 is primarily configured to guide most of the oil from the shaft 40 into the first conduit 88. However, to the extent there is residual oil which travels beyond the primary annular groove 82, the secondary annular groove 84 receives approximately the remaining 10 percent of the oil flung radially outward by spinning motion of shaft 40 and guides the oil to the second conduit 90 so that any remaining excess oil may travel to the drain gallery 92.

Referring again to FIGS. 2 and 3, the vehicle engine and turbocharger includes a center housing 54, a bore defined by the center housing 54, a journal bearing 56, and a rotating assembly 38. The bore may be defined by the center housing 54 and having a primary annular groove 82 and a secondary annular groove 84 configured to receive a fluid. The journal bearing 56 may be disposed within the bore. The rotating assembly 38 includes the shaft 40 with a turbine wheel 46 and a compressor wheel 58. The turbine wheel 46 may be configured to be driven by the post-combustion gasses while the compressor wheel 58 may be configured to pressurize the airflow for delivery to the combustion chamber.

The shaft 40 may include a longitudinal axis wherein the shaft 40 may be supported by the journal bearing 56 for rotation within the bore about the longitudinal axis. The primary and secondary annular grooves 82, 84 may be configured to receive fluid from the spinning shaft 40 and/or journal bearing 56. Upon contacting the surface of the primary annular groove 82 and the secondary annular groove 84, the fluid may flow into the drain gallery 92. As noted the primary annular groove 82 may be in communication with the drain gallery 92 via a first conduit 88 while the secondary annular groove 84 may be in fluid communication with the drain gallery 92 via second conduit 90. However, it is understood that a single shared conduit may be used for both the first annular groove and the second annular groove.

It is understood that the shaft 40 includes a proximate end 40A proximate to the turbine wheel 46 and a distal end 40B proximate to the compressor wheel 58. It is also understood that the primary and secondary annular grooves 82, 84 are defined in the housing proximate to the proximate end 40A of the shaft 40. The primary and secondary annular grooves 82, 84 may, but not necessarily, be defined in the housing between the journal bearing 56 and the turbine wheel 46. As shown in FIG. 3, the journal bearing 56 may be configured as a fully-floating or a semi-floating bearing 56 such that the fluid fed thereto forms a first fluid film between the bore and the journal bearing 56 and a second fluid film between the journal bearing 56 and the shaft 40. With further reference to FIG. 4, the journal bearing 56 may include a first surface 72 defined by an inner diameter 78, a second surface 74 defined by an outer diameter 80, and a passage 76 that connects the first and second surfaces 72, 74. It is understood that multiple passages 76 may also be implemented in the journal bearing 56 to fluidly connect the first and second surfaces 72, 74. The journal bearing 56 may, but not necessarily, be a brass bushing.

Referring back to FIG. 3, the primary and secondary annular grooves 82, 84 are shown in an enlarged view. As shown, the primary annular groove 82 may define a first radius 94 while the secondary annular groove 84 may define a second radius 96. The second radius 96 may, but not necessarily, be greater than the first radius 94. However, it is understood that second radius 96 and first radius 94 may alternatively, be substantially the same or the second radius 96 may, but not necessarily be less than first radius 94. It is understood that the primary and secondary annular grooves 82, 84 may be machined and/or cast into the center housing 54.

The present disclosure also provides for a turbocharger which includes a center housing 54, a bore defined by the center housing 54, a journal bearing 56 and a rotating assembly 38. The bore may further include a primary annular groove 82 and a secondary annular groove 84 configured to receive a fluid from the rotating shaft 40 and/or journal bearing 56. The journal bearing 56 may be disposed within the bore such that the primary annular groove 82 encircles at least a portion of the proximate end 40A of the shaft 40 while the secondary annular groove 84 encircles a shaft portion 48 of the turbine 46. It is understood that the primary and the secondary annular grooves 82, 84 are formed in the center housing 54 in the region between the journal bearing 56 and the turbine seal 100 as shown in FIG. 3.

The rotating assembly 38 includes a shaft 40 with a turbine wheel 46 configured to be driven by post-combustion gasses emitted by the combustion chamber and a compressor wheel 58 configured to pressurize the airflow for delivery to the combustion chamber. The shaft 40 includes a longitudinal axis and is supported by the journal bearing 56 for rotation within the bore about the longitudinal axis. Similar to the aforementioned embodiment, multiple journal bearings 56 may be implemented. However, the journal bearing 56 disposed closest to the turbine 46 feeds fluid, together with the rotating shaft 40, to the primary annular groove 82.

The shaft 40 may include a longitudinal axis wherein the shaft 40 may be supported by the journal bearing 56 for rotation within the bore about the longitudinal axis. The primary and secondary annular grooves 82, 84 may be configured to receive fluid from the spinning shaft 40 and/or journal bearing 56 via centrifugal force. As oil 28 travels along the spinning shaft 40 toward the primary annular groove 82, a majority of the excess oil 28 will be flung from the shaft 40 and journal bearing 56 into the primary annular groove via centrifugal force. The excess oil will then drain into the drain gallery 92 via the first conduit 88. To the extent that any additional excess oil remains on the proximate end 40A of the shaft 40 and turbine shaft 48 and to the extent such excess oil 28 continues to travel toward the turbine seal 100, such oil 28 is flung from the turbine shaft 48 into the secondary annular groove 84 from the rotating shaft via centrifugal force. The oil 28 is then transferred to the drain gallery 92 via a second conduit 90. It is understood that a single shared conduit may be used by both grooves 82, 84 in lieu of first and second conduits 88, 90.

Accordingly, the journal bearing 56 and/or rotating shaft 40 feeds the fluid to the primary annular groove 82 while the shaft portion 48 of the turbine 46 (which forms part of the rotating shaft 40) feeds residual fluid from the shaft 40 to the secondary annular groove 84. Upon contacting the surface of the primary annular groove 82 and the secondary annular groove 84, the fluid (oil 28) may flow into the drain gallery 92. As indicated, the primary annular groove 82 may be in communication with the drain gallery 92 via a first conduit 88 while the secondary annular groove 84 may be in fluid communication with the drain gallery 92 via second conduit 90.

Similar to the earlier embodiment of the vehicle engine described, the shaft 40 of the turbocharger includes a proximate end 40A proximate to the turbine wheel 46 and a distal end 40B proximate to the compressor wheel 58. It is also understood that the primary and secondary annular grooves 82, 84 are defined in the center housing 54 proximate to the proximate end 40A of the shaft 40. The primary and secondary annular grooves 82, 84 may, but not necessarily, be defined in the center housing 54 between the journal bearing 56 and the turbine wheel 46. As shown in FIGS. 2 and 3, the journal bearing 56 may be configured as a fully-floating or semi-floating bearing 56 such that the fluid fed thereto forms a first fluid film 110 between the bore and the journal bearing 56 and a second fluid film 112 between the journal bearing 56 and the shaft 40. Referring back to FIG. 3, the primary and secondary annular grooves 82, 84 are shown in an enlarged view. As shown, the primary annular groove 82 may define a first radius 94 while the secondary annular groove 84 may define a second radius 96. The second radius 96 may, but not necessarily, be greater than the first radius 94. However, it is understood that second radius 96 and first radius 94 may alternatively, be substantially the same or the second radius 96 may, but not necessarily be less than first radius 94. It is understood that the primary and secondary annular grooves 82, 84 may be machined and/or cast into the center housing 54.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An internal combustion engine comprising:
an engine block defining at least one combustion chamber configured to receive an air-fuel mixture for combustion therein and configured to exhaust post-combustion gasses therefrom; and
a turbocharger configured to receive an airflow from the ambient and the post-combustion gasses from the combustion chamber, the turbocharger including:
a center housing;
a bore defined by the center housing and having a primary annular groove and a secondary annular groove configured to receive a fluid, the primary and secondary annular grooves are in fluid communication with a drain gallery;
a journal bearing disposed within the bore such that the primary and secondary annular grooves encircle the journal bearing and feed the fluid thereto, the journal bearing is configured as one of a fully-floating or semi-floating bearing such that the fluid fed thereto forms a first fluid film between the bore and the journal bearing and a second fluid film between the journal bearing and a shaft, and the journal bearing includes a first surface defined by an inner diameter, a second surface defined by an outer diameter, and a passage that connects the first and second surfaces;
a first conduit and a second conduit, the first conduit coupling the primary annular groove to the drain gallery and the second conduit coupling the secondary annular groove to the drain gallery; and
a rotating assembly having the shaft with a turbine wheel configured to be driven by the post-combustion gasses and a compressor wheel configured to pressurize the airflow for delivery to the combustion chamber;
wherein:
the shaft has a longitudinal axis and is supported by the journal bearing for rotation within the bore about the longitudinal axis,
the primary and secondary annular grooves being in fluid communication with a drain, and
the primary annular groove defines a first radius and the secondary annular groove defines a second radius, the second radius being greater than the first radius.

2. The engine of claim 1 wherein the journal bearing is a brass bushing.

3. A turbocharger for an internal combustion engine having a combustion chamber, the turbocharger comprising:
a center housing;
a bore defined by the center housing and having a primary annular groove and a secondary annular groove configured to receive a fluid;
a journal bearing disposed within the bore such that the primary and secondary annular grooves encircle the journal bearing and feed the fluid thereto, and the journal bearing is configured as a fully-floating bearing such that the fluid fed thereto forms a first fluid film between the bore and the journal bearing and a second fluid film between the journal bearing and a shaft;
a rotating assembly having the shaft with a turbine wheel configured to be driven by post-combustion gasses emitted by the combustion chamber and a compressor wheel configured to pressurize the airflow for delivery to the combustion chamber wherein the shaft includes a longitudinal axis and is supported by the journal bearing for rotation within the bore about the longitudinal axis; and
a first conduit and a second conduit, the first conduit coupling the primary annular groove to the drain gallery and the second conduit coupling the secondary annular groove to the drain gallery;
wherein the journal bearing includes a first surface defined by an inner diameter, a second surface defined by an outer diameter, and a passage that connects the first and second surfaces, and the primary and secondary annular grooves are in fluid communication with a drain gallery, and wherein the primary annular groove defines a first radius and the second annular groove defines a second radius, the second radius being greater than the first radius.

4. The turbocharger of claim 3 wherein the journal bearing is a brass bushing.

5. The turbocharger of claim 4 wherein the drain gallery is in communication with an oil outlet.

* * * * *